US009878950B1

(12) United States Patent
Fewox et al.

(10) Patent No.: US 9,878,950 B1
(45) Date of Patent: Jan. 30, 2018

(54) LIQUID GYPSUM SET ACCELERATOR

(71) Applicant: NATIONAL GYPSUM PROPERTIES, LLC, Charlotte, NC (US)

(72) Inventors: Chris Fewox, Pineville, NC (US); Joseph J. Bailey, Charlotte, NC (US)

(73) Assignee: National Gypsum Properties, LLC, Charlotte, NC (US)

( * ) Notice: Subject to any disclaimer, the term of this patent is extended or adjusted under 35 U.S.C. 154(b) by 0 days.

(21) Appl. No.: 15/206,762

(22) Filed: Jul. 11, 2016

(51) Int. Cl.
C04B 28/14 (2006.01)
C04B 24/38 (2006.01)
C04B 111/00 (2006.01)
C04B 103/12 (2006.01)

(52) U.S. Cl.
CPC ............ *C04B 28/14* (2013.01); *C04B 24/383* (2013.01); *C04B 2103/12* (2013.01); *C04B 2111/00629* (2013.01)

(58) Field of Classification Search
CPC ... C04B 24/383; C04B 28/14; C04B 2103/12; C04B 2111/00629
See application file for complete search history.

(56) References Cited

U.S. PATENT DOCUMENTS

| 6,221,151 | B1 | 4/2001 | Campbell et al. |
| 6,409,825 | B1 * | 6/2002 | Yu ............................ C04B 28/14 |
| | | | 106/772 |
| 8,597,426 | B2 * | 12/2013 | Lee ........................ C04B 24/246 |
| | | | 106/772 |
| 2006/0243171 | A1 * | 11/2006 | Yu ........................... B02C 17/00 |
| | | | 106/778 |
| 2015/0298073 | A1 | 10/2015 | Ray et al. |

FOREIGN PATENT DOCUMENTS

| GB | 2179956 A | * | 3/1987 |
| WO | WO 2008/009607 A1 | * | 1/2008 |

* cited by examiner

*Primary Examiner* — Anthony J Green
(74) *Attorney, Agent, or Firm* — Dority & Manning, P.A.

(57) ABSTRACT

A liquid accelerator composition for accelerating the setting reaction of calcium sulfate hemihydrate and water and methods of forming a liquid gypsum accelerator are provided. The liquid accelerator composition includes a liquid media in which calcium sulfate dihydrate is less than fully soluble and a ground product of a mill grinding of a mixture comprising calcium sulfate dihydrate.

28 Claims, 2 Drawing Sheets

LIQUID GYPSUM SET ACCELERATOR

BACKGROUND OF THE INVENTION

The present invention relates to compositions for gypsum board, and more specifically to liquid gypsum set accelerators used in the manufacture of gypsum board.

Gypsum board (e.g., wallboard or drywall) is commonly used in the building industry for the construction of walls and other structures. Gypsum has a number of desirable physical properties, including fire resistance, thermal and hydrometric dimensional stability, compressive strength, and neutral pH. A major ingredient in the manufacture of gypsum wallboard is calcium sulfate hemihydrate, commonly referred to as "calcined gypsum" or "stucco." Stucco is prepared by drying, grinding, and calcining raw gypsum (i.e. calcium sulfate dihydrate). The raw gypsum is dried in a kiln to remove free moisture and ground in a mill to a desired fineness. Dried, fine-ground gypsum is also referred to as "land plaster." The land plaster is calcined by heating to undergo a dehydration reaction that produces calcium sulfate hemihydrate (stucco) and water vapor, as described by the following chemical equation:

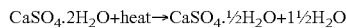

$$CaSO_4 \cdot 2H_2O + \text{heat} \rightarrow CaSO_4 \cdot \tfrac{1}{2}H_2O + 1\tfrac{1}{2}H_2O$$

The calcined gypsum, or stucco, has the desirable property of being chemically reactive with water and will "set" rather quickly when the two are mixed together, to form a matrix of calcium sulfate dihydrate crystals. The hydration or setting reaction is the reverse of the calcination reaction, and proceeds according to the following chemical equation:

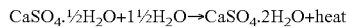

$$CaSO_4 \cdot \tfrac{1}{2}H_2O + 1\tfrac{1}{2}H_2O \rightarrow CaSO_4 \cdot 2H_2O + \text{heat}$$

As shown by the chemical equation, the setting reaction is exothermic and is accompanied by the release of heat.

Gypsum wallboard comprises a gypsum core sandwiched between two sheets of facing material (e.g., paper or fiberglass). The gypsum core is commonly produced from a gypsum slurry that is prepared as a mixture of dry and wet ingredients. The dry ingredients consist primarily of stucco, and may include, but are not limited to, any combination of fiberglass, set accelerators, functional fillers (e.g., vermiculite), potash, crystal modifiers (e.g., boric acid), binders (e.g., natural polymers such as starch), and/or other ingredients as are known in the art. The wet ingredients consist of water and may include paper pulp (the "pulp paper solution"), and/or one or more additional components that are known in the art, including, potash, dispersants, set retarders, polymers, wax emulsion, silicone, surfactants, and thickening agents. If present, the pulp paper solution along with the gauging water provide a significant portion of the water that forms the gypsum slurry of the core composition of the wallboard. The dry ingredients, gauging water, and the pulp paper solution contain the basic chemical components of a piece of wallboard.

The commercial manufacture of gypsum wallboard typically involves a continuous, high-speed process. The dry and wet ingredients, gauging water, and pulp paper solution are combined in a mixer (e.g., a pin mixer) to create a fluid mixture or slurry. The gypsum slurry exits the pin mixer into a canister and is discharged through an outlet chute or "boot," which spreads the slurry onto a moving, continuous sheet of bottom facing material (back). A moving, continuous sheet of top facing material (face) is placed on the slurry, so that the slurry is sandwiched between the top and bottom facing materials to form the gypsum board. The board passes through a forming station which forms the wallboard to the desired thickness and width. Although the facing material is described as paper, other materials known in the art may be used as a facing material, such as fiberglass mat.

The board travels along a belt line for several minutes, during which time the board stiffens and "sets" as the stucco and water rapidly undergo a hydration reaction to form crystals of calcium sulfate dihydrate, as described above. The boards are cut to a desired length and fed into a large, continuous kiln for drying. During the drying process, the excess water (free water) is evaporated from the gypsum core while the chemically bound water is retained in the newly formed gypsum crystals.

The time required to complete the setting reaction is generally governed by the speed and length of the production line and typically ranges from about 5 to 15 minutes. The rate of the stucco hydration reaction can vary based on factors such as the method of calcination, slurry temperature, and the type of raw gypsum (e.g., natural or synthetic). Gypsum set accelerators and retarders are commonly added to the gypsum slurry to adjust the rate of the setting reaction and ensure that the gypsum slurry has sufficiently set and hardened to allow the board to be cut, and that the hydration reaction is substantially complete before drying in the kiln. The ratio between the accelerator and retarder, as well as the quality of these agents, along with other factors such as mix temperature and the water to stucco ratio will affect the hardening rate of the stucco.

A common accelerator used to reduce the set time of the gypsum slurry is calcium sulfate dihydrate, which is produced as a dry powder from crushed and dried gypsum. The gypsum may be synthetic or naturally occurring. The raw gypsum is ground in a high energy mill to produce a fine gypsum powder that is used as a catalyst and crystal seed source for gypsum hydration and crystal nucleation during gypsum board manufacture.

Land plaster based accelerators are susceptible to degradation and reduced potency before they can be added to the gypsum slurry. The process of grinding the gypsum to produce land plaster generates heat, which may cause partial calcination and can require intermediate cooling stages that interrupt the manufacturing process. Calcination of the accelerator may also occur upon mixing with stucco that is still warm from the calcination processor in elevated process temperatures. Humid conditions also lead to a loss in potency. The exposure to moisture may cause clumping of the calcium sulfate dihydrate particles and may also reduce crystallinity. The loss in potency can cause inconsistent hydration reaction rates and may increase the amount of the accelerator required to achieve the desired setting time. Furthermore, the limited shelf life of the accelerator increases the difficulty in maintaining a store of accelerator to support a continuous production process.

Land plaster based accelerators can also be difficult to disperse in the gypsum slurry, and can cause problems in the manufacturing process. Fine dry powders are susceptible to caking and clumping during storage, and can also form insoluble agglomerates when introduced to water. To ensure that the accelerator is adequately dispersed in the gypsum slurry, conventional accelerators are typically introduced to the manufacturing process at the pin mixer, with the stucco and other dry ingredients. However, the accelerator begins to promote the setting reaction in the mixer and can cause lumps to form in the gypsum slurry. These lumps can clog and obstruct the flow of the gypsum slurry through the equipment, may result in uneven discharge and spreading of the gypsum slurry onto the facing material, may interfere with the forming of the gypsum board, and may cause breaks in the paper facing material which can create process upsets and downtime. Thus, the use of conventional accelerators often requires interruption of manufacturing for periodic cleaning of the mixer and other equipment, resulting in substantial process downtime.

Therefore, it would be desirable to provide a gypsum set accelerator that has reduced susceptibility to degradation and loss of potency, and that reduces process upset and the need for equipment maintenance and downtime. It would also be useful to minimize the dwell time of the accelerator while the gypsum slurry is in the equipment, to allow the majority of the setting reaction to occur after the gypsum slurry has been applied to the facing material and the board is formed. Thus, it would be desirable to provide a gypsum set accelerator that is more easily dispersed in the gypsum slurry, to allow the accelerator to be introduced into the manufacturing process downstream of the mixer—e.g., at the canister or boot.

SUMMARY OF THE INVENTION

Liquid gypsum accelerators are disclosed that comprise a slurry including ground gypsum and a liquid medium. The ground gypsum is in an amount of about 95 wt % to about 20 wt % of the slurry and has a particle size distribution with at least about 15% of the mass of ground gypsum having a particle size of about 5.5 µm or less. The liquid medium is selected wherein gypsum has a solubility of about 10 g/l or less at 25° C.

In another embodiment, a method of making a gypsum set accelerator comprises the steps of providing gypsum and a liquid medium in which gypsum has a solubility of about 10 g/l or less at 25° C. The gypsum is ground to a particle size distribution with at least about 15% of the mass of ground gypsum having a particle size of about 5.5 µm or less. The liquid medium is added to the gypsum to form a slurry comprising about 95 wt % to about 20 wt % gypsum. In a further embodiment, the gypsum is provided by the steps of providing stucco and an aqueous liquid medium. The stucco and aqueous liquid medium are combined to undergo a hydration reaction and precipitate the gypsum from the aqueous liquid medium. The gypsum may be ground during precipitation.

In another embodiment, a method of making a gypsum board composition comprises the steps of providing dry ingredients including stucco, wet ingredients including water, gypsum and a liquid medium in which gypsum has a solubility of about 10 g/l or less at 25° C. The dry and wet ingredients are mixed to form a gypsum slurry. The gypsum is ground to a particle size distribution with at least about 15% of the mass of ground gypsum having a particle size of about 5.5 µm or less. The liquid medium is added to the gypsum to form a gypsum set accelerator comprising about 95 wt % to about 20 wt % gypsum. The gypsum set accelerator is added to the gypsum slurry.

BRIEF DESCRIPTION OF THE DRAWINGS

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION OF THE INVENTION

Figure 1:
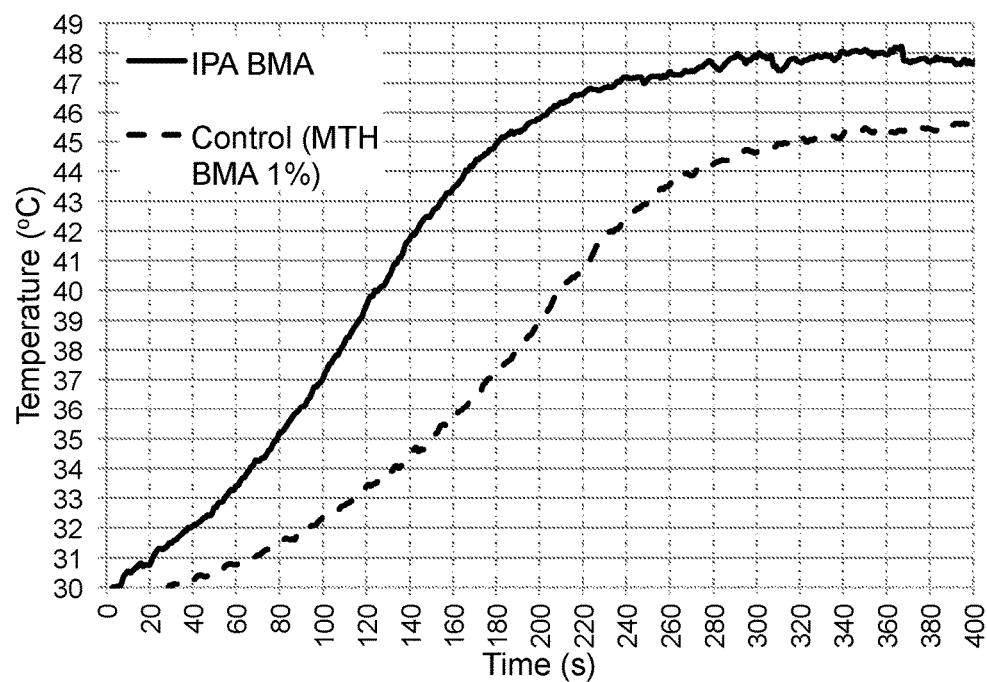
FIG. 1 is a data plot of the stucco hydration rate using a conventional and a liquid gypsum set accelerator, as measured by the temperature of the gypsum slurry over time.

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Compositions for liquid gypsum set accelerators used in the manufacture of gypsum board are described. The liquid accelerator comprises a slurry of land plaster in a liquid medium in which the calcium sulfate dihydrate is no more than moderately soluble. Those of skill in the art will appreciate that the solubility of the calcium sulfate dihydrate will vary according to the process conditions, such as the temperature. In one embodiment, the calcium sulfate dihydrate is no more than moderately soluble under normal process conditions—e.g., a solubility of about 10 g/l or less at 25° C. In a preferred embodiment, the land plaster has a solubility in the liquid medium that is similar to water—e.g., about 2.5 g/l at 25° C. or less. More preferably, the land plaster is substantially insoluble in the liquid medium—e.g., a solubility of about 1 g/l at 25° C. or less.

The liquid accelerator composition may comprise land plaster in an amount between about 95 wt % to about 20 wt %, and liquid media in an amount between about 5 wt % to about 80 wt %. In a preferred embodiment, the liquid accelerator composition comprises land plaster in an amount between about 40 wt % to about 20 wt %, and liquid media in an amount between about 60 wt % to about 80 wt %. In a particularly preferred embodiment, the liquid accelerator composition comprises land plaster in an amount of about 35 wt %.

Suitable liquid media include alcohols, glycerin, water and other liquid media as are known in the art. Combinations of liquid media may also be used, including multiphase mixtures liquid media (e.g., organic and aqueous phases). In one embodiment, the liquid medium comprises water or other aqueous composition. In a preferred embodiment, the liquid media is non-aqueous, and more preferably is anhydrous. In a particularly preferred embodiment, the liquid media is reagent grade (anhydrous) isopropyl alcohol.

In some cases, the use of an aqueous liquid media may produce accelerators that have reduced potency in comparison to accelerators based on non-aqueous liquid media. Where water or other aqueous composition is used, the liquid medium may include a solubility inhibitor(s). Suitable solubility inhibitors include phosphates, such as sodium trimetaphosphate (STMP). Without being limited by any particular theory, it is believed that the solubility inhibitors function to reduce the loss of active sites and the decrease in crystallinity of the land plaster particles which may occur in an aqueous liquid medium.

The land plaster may be derived from gypsum that is naturally occurring or synthetic (e.g., a byproduct of an industrial process). High grade and low grade land plasters may be used. High grade land plaster typically comprises at least about 80 wt % calcium sulfate dihydrate. Low grade land plasters commonly include anhydrites, sand, clay and/or other inert materials and impurities. The inert materials and impurities are typically present in amounts small enough that they are not believed to significantly affect the setting reaction or impair activity of the accelerator. In one embodiment, the calcium sulfate dihydrate is substantially free of phosphogypsum.

The land plaster may undergo additional grinding to further reduce the size and increase the number of particles. In one embodiment, the gypsum set accelerator has a particle size distribution with at least about 15% of the mass of land plaster having a particle size of about 5.5 μm or less, and preferably at least about 40%. In a preferred embodiment, the gypsum set accelerator has a particle size distribution with a mass median diameter ($D_{50}$) of less than 15 μm, and preferably about 5.5 μm or less.

The additional grinding increases the crystalline surface area and number of active sites for accelerating the setting reaction of the gypsum slurry. The active sites promote the stucco hydration reaction by acting as nucleation sites for the formation of calcium sulfate dihydrate crystals in the gypsum slurry. The higher the number of active sites, the greater the potency of the accelerator and the shorter the time period required for the gypsum slurry to set (set time). The improved hydration reaction rate reduces the amount of accelerator needed for manufacture, and allows increased rates of wallboard production and shortened manufacturing line lengths. The increased number of accelerator particles also results in gypsum board having increased gypsum crystal counts per unit volume of wallboard.

A variety of methods may be used to further grind the land plaster, including a ball mill, an attritor mill, a vibration mill, bead mill, and other methods known in the art. Grinding aids and/or additional grinding media may also be used, as are known in the art. In a preferred embodiment, the land plaster is ground in a planetary ball mill. The planetary ball mill utilizes several grinding mechanisms that involve a combination of compressive, shear and abrasive forces—including bearing on bearing collisions, bearing on wall collisions, and particle on particle collisions. Without being limited to any particular theory, the combination of grinding mechanisms is believed to produce a particle morphology and/or size distribution with an unexpectedly high number of active sites compared to other methods of grinding—e.g., a jet mill which essentially operates by particle on particle collisions.

The land plaster may be ground separately and then mixed with the liquid media to form the liquid gypsum set accelerator slurry. In one embodiment, the land plaster is ground in the presence of the liquid medium, which is believed to produce finer particles that are well dispersed in the resulting liquid accelerator slurry. In an alternative embodiment, the liquid gypsum set accelerator may be produced by combining stucco with an aqueous liquid medium such as water or other aqueous composition. As the hydration reaction proceeds, the newly formed gypsum crystals precipitate from the liquid medium. In a further embodiment, the stucco and aqueous liquid medium are combined in a mill, and the newly formed gypsum crystals are ground during precipitation to form a slurry of fine land plaster particles. The aqueous liquid medium preferably includes a solubility inhibitor, such as a phosphate.

The presence of the liquid medium is also believed to protect the gypsum set accelerator from degradation and the loss of potency during grinding and storage. Grinding in liquid media reduces friction and exposure to high temperatures, which reduces the risk of calcination and the need to interrupt the grinding process for cooling. Furthermore, the liquid gypsum set accelerator is found to be shelf stable, with minimal loss of effectiveness over time due to aging when maintained in solution. X-ray powder diffraction analysis shows that conventional dry land plaster loses crystallinity after prolonged exposure to humid conditions. The presence of the liquid medium, particularly an anhydrous liquid medium (e.g., alcohol or glycerin), is found to protect the freshly created active sites from degradation. The increased storage life facilitates continuous wallboard manufacturing, and the improved effectiveness and stability of the liquid gypsum set accelerator reduces the amount of accelerator required in the manufacturing process.

The liquid gypsum set accelerator may be introduced to the manufacturing process at any point in production process. In contrast to conventional dry accelerators which are typically added to the pin mixer, the fluidity and consistency of the liquid gypsum set accelerator reduces the need for aggressive mixing to ensure dispersion in the gypsum slurry. The liquid gypsum accelerator may be effectively introduced to the gypsum slurry at any point in the manufacturing process, including at the pin mixer, foam generator and/or roll coater. In a preferred embodiment, the liquid gypsum set accelerator is introduced at a point after the wet and dry ingredients are combined in the pin mixer (e.g., at the canister or boot), to reduce the formation of lumps and build up in the pin mixer and minimize the dwell time of the accelerator in the gypsum slurry. As a result, the mixer requires less frequent cleaning, and the problems of process downtime and upset are reduced.

The liquid gypsum set accelerator may also comprise one or more additives. For example, the aqueous liquid media may also include additives that protect the land plaster from degradation. Such additives include soaps or surfactants, dispersants such as polycaboxylate ethers (PCE), naphthalene sulfonates, lignosulfonates, alginates, saccharides, phosphates, complexing agents such as EDTA, and other additives known in the art. The liquid media may also be a multiphase mixture containing varied fractions of organic and aqueous phases of additives and liquid media or combinations of liquid media.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Example 1

Liquid gypsum set accelerator was prepared in a planetary ball mill (Retsch—Newtown, Pa.) by grinding a mixture of 30 g land plaster and 60 ml isopropyl alcohol (isopropanol) for 1 hour at 500 rpm in a 125 ml stainless steel vessel equipped with thirty 5 mm stainless steel bearings. The resulting slurry comprised about 35 wt % land plaster. A conventional ball mill accelerator was used as a control.

The particle size distribution of the liquid gypsum set accelerator and control were measured using laser diffraction analysis (Microtrac—York, Pa.), and are shown in Table 1. The liquid gypsum set accelerator had a particle size distribution that was substantially smaller than the control. Approximately 50% of the mass of the liquid gypsum set accelerator particles had a diameter ($D_{50}$) of about 5.52 μm, and about 45.74% of the particles had a diameter less than 5.5 μm (<5.5 μm). In contrast, land plaster without grinding had a $D_{50}$ of about 39.79 μm. The dry accelerator comprised of a ground mixture of land plaster and starch (1:1, land plaster:starch) had a $D_{50}$ of about 15.71 μm.

TABLE 1

Particle Size Distribution

| Sample | $D_{50}$ (μm) | <5.5 μm (%) |
| --- | --- | --- |
| Land Plaster (no grinding) | 39.79 | 11.29 |
| Starch (no grinding) | 26.70 | 9.75 |
| Dry Accelerator (1 hr grinding) | 15.71 | 9.66 |
| Liquid Accelerator (1 hr grinding) | 5.52 | 45.74 |
| Liquid Accelerator (2 hr grinding) | 4.32 | 56.82 |

Example 2

The gypsum set time was measured for gypsum boards prepared using either the liquid gypsum set accelerator or a control accelerator as described in Example 1. Experimental ½ inch, 1250 lb/msf gypsum boards were prepared in a laboratory, having a gypsum slurry composition as set forth in Table 2, comprising about 1% accelerator on stucco (equivalent land plaster basis). The control accelerator was added to the gypsum board composition before liquid reagents, as in conventional manufacturing processes. The liquid gypsum set accelerator was added to the gypsum board composition with liquid reagents, as in at the boot or canister.

TABLE 2

Gypsum Board Composition

| Component | Weight (g) |
| --- | --- |
| Stucco | 783 |
| Dispersant | 2.5 |
| Accelerator | 9.25 |
| Retarder | 0.04 |
| Starch | 16.4 |
| Paper Pulp | 0.54 |
| Soap Solution | 14 |
| Total Water | 744.44 |
| Dextrose | 1.0 |
| Coalescing Agent | 0.14 |
| Total | 1571.31 |

The rate of the hydration reaction was measured as the temperature of the gypsum slurry over time, and is shown in FIG. 1. The gypsum board prepared with the liquid gypsum set accelerator reached a higher peak temperature and exhibited a rate of increase in temperature that was substantially greater than the control gypsum board prepared with conventional ball mill accelerator. In particular, the control gypsum boards reached a peak temperature of about 45-46° C. in about 340 seconds, whereas the gypsum board prepared with liquid gypsum set accelerator reached the same temperature in about 190 seconds—i.e. in a little more than half the time observed using a conventional accelerator.

Example 3

Figure 2:
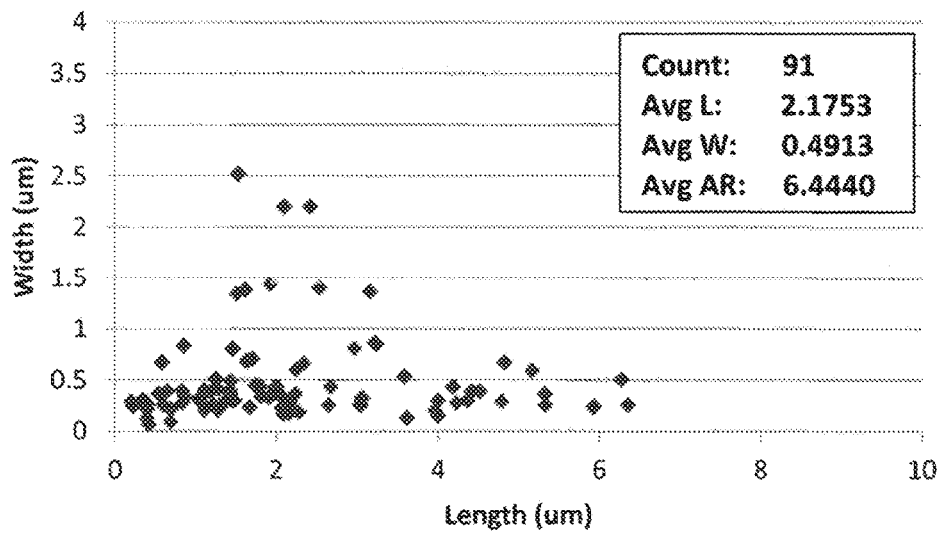
FIG. 2 is a data plot showing the crystal morphology of a wallboard produced using a conventional gypsum accelerator.
Figure 3:
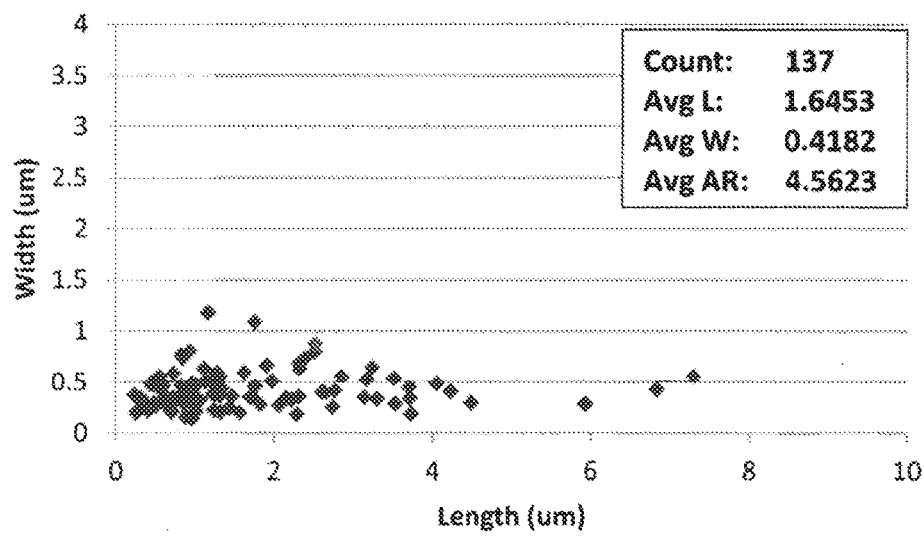
FIG. 3 is a data plot showing the crystal morphology of a wallboard produced using a liquid gypsum set accelerator.

The crystal morphology of gypsum board samples prepared using conventional and liquid gypsum set accelerators was compared. Samples of set gypsum board compositions were prepared using the liquid gypsum set accelerator and control conventional dry ball-milled accelerator of Example 1. The crystal morphology of the samples was analyzed by scanning electron micrograph (SEM), and crystal habit and numbers were tabulated by analyzing a known area of the SEM micrograph. The control sample was found to have a gypsum crystal count of 91 over an area of $112.5\mu^2$, with an average length of 2.18 μm, an average width of 0.49 μm, and an average aspect ratio of 6.44, as shown in FIG. 2. The sample prepared using the liquid gypsum set accelerator was found to have a significantly higher gypsum crystal count of 137, with smaller gypsum crystals having an average length of 1.65 μm, an average width of 0.42 μm, and an average aspect ratio of 4.56, as shown in FIG. 3.

Example 4

The compressive strength was measured for samples of set gypsum prepared using the liquid gypsum set accelerator and control accelerator. The samples were prepared as described in Example 2, except with a water to stucco ratio (w/s) of 1.3:1 (425 g water and 325 g stucco). The samples were mixed in a blender and formed into 2 inch cubes. Compositions containing the liquid gypsum set accelerator experienced some foaming in the blender due to the presence of isopropanol. A defoaming agent was used to ensure that the cubes had a consistent weight (density) across the samples. The compressive strength of the sample cubes was measured pursuant to the ASTM C472 standard as is known in the art, and the results shown in Table 3.

TABLE 3

| | Compressive Strength | |
| --- | --- | --- |
| Sample | Weight (g) | Compressive Strength (psi) |
| Control | 95.47 | 913.60 |
| Land Plaster/Isopropanol | 93.86 | 945.10 |

The physical properties of the set gypsum samples were not affected by the liquid gypsum set accelerator and the increased activity of the accelerator in promoting the hydration reaction. Samples prepared using the liquid gypsum set accelerator were found to have similar or improved compressive strength in comparison to samples prepared with the control accelerator. Tests also showed comparable nail pull strength for boards prepared using the liquid gypsum set accelerator in comparison to conventional ball mill accelerator.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

We claim:

1. A gypsum set accelerator composition, comprising:
   a slurry including:
   ground gypsum in an amount of about 95 wt % to about 20 wt % of the slurry, the ground gypsum having a particle size distribution with at least about 15% of the mass of ground gypsum having a particle size of about 5.5 μm or less; and
   a non-aqueous liquid medium in which gypsum has a solubility of about 10 g/l or less at 25° C.

2. The gypsum set accelerator composition of claim 1, wherein the ground gypsum is in an amount of about 40 wt % to about 20 wt % of the slurry.

3. The gypsum set accelerator composition of claim 1, wherein the ground gypsum is in an amount of about 35 wt % of the slurry.

4. The gypsum set accelerator composition of claim 1, wherein gypsum has a solubility of about 2.5 g/l or less in the liquid medium.

5. The gypsum set accelerator composition of claim 1, wherein gypsum has a solubility of about 1 g/l or less in the liquid medium.

6. The gypsum set accelerator composition of claim 1, wherein the liquid medium is selected from the group consisting of: an alcohol, glycerin and combinations thereof.

7. The gypsum set accelerator composition of claim 1, wherein the liquid medium is anhydrous isopropyl alcohol.

8. The gypsum set accelerator composition of claim 1, wherein the liquid medium includes a solubility inhibitor.

9. The gypsum set accelerator composition of claim 8, wherein the solubility inhibitor is a phosphate.

10. The gypsum set accelerator composition of claim 8, wherein the solubility inhibitor is sodium trimetaphosphate.

11. The gypsum set accelerator composition of claim 1, further comprising an additive selected from the group consisting of: a soap, a surfactant, a dispersant, naphthalene sulfonate, a lignosulfonate, an alginate, a saccharide, a phosphate, a complexing agent and combinations thereof.

12. The gypsum set accelerator composition of claim 1, wherein the ground gypsum has a particle size distribution with at least about 40 wt % of the mass of ground gypsum having a particle size of about 5.5 µm or less.

13. The gypsum set accelerator composition of claim 1, wherein the ground gypsum has a particle size distribution with a mass median diameter of less than 15 µm.

14. The gypsum set accelerator composition of claim 1, wherein the ground gypsum has a particle size distribution with a mass median diameter of about 5.5 µm or less.

15. A method of making a gypsum set accelerator, comprising the steps of:
providing gypsum and a non-aqueous liquid medium in which gypsum has a solubility of about 10 g/l or less at 25° C.;
grinding the gypsum to a particle size distribution with at least about 15% of the mass of ground gypsum having a particle size of about 5.5 µm or less; and
combining the liquid medium and the ground gypsum to form a slurry comprising about 95 wt % to about 20 wt % gypsum.

16. The method of claim 15, wherein the slurry comprises about 40 wt % to about 20 wt % gypsum.

17. The method of claim 15, wherein gypsum has a solubility in the liquid medium of about 2.5 g/l or less.

18. The method of claim 15, wherein the liquid medium is anhydrous isopropyl alcohol.

19. The method of claim 15, wherein the liquid medium includes a solubility inhibitor.

20. The method of claim 19, wherein the solubility inhibitor is a phosphate.

21. The method of claim 15, wherein the gypsum is ground to a particle size distribution with a mass median diameter of less than 15 µm.

22. The method of claim 15, wherein the gypsum is ground to a particle size distribution with a mass median diameter of about 5.5 µm or less.

23. The method of claim 15, wherein the gypsum is ground in at least a portion of the liquid medium.

24. The method of claim 15, wherein the gypsum is ground in a planetary ball mill.

25. A method of making a gypsum board composition, comprising the steps of:
providing dry ingredients including stucco, and wet ingredients including water;
mixing the dry and wet ingredients to form a gypsum slurry;
providing gypsum and a liquid medium in which gypsum has a solubility of about 10 g/l or less at 25° C.;
grinding the gypsum to a particle size distribution with at least about 15% of the mass of ground gypsum having a particle size of about 5.5 µm or less;
combining the liquid medium and the gypsum to form a gypsum set accelerator comprising about 95 wt % to about 20 wt % gypsum;
adding an aqueous foam to the gypsum slurry; and
adding the gypsum set accelerator to the gypsum slurry with the foam.

26. A method of making a gypsum set accelerator, comprising the steps of:
combining stucco and an aqueous liquid medium in which gypsum has a solubility of about 10 g/l or less at 25° C., to undergo a hydration reaction and precipitate gypsum from the aqueous liquid medium; and
grinding the gypsum during precipitation to a particle size distribution with at least about 15% of the mass of ground gypsum having a particle size of about 5.5 µm or less;
wherein the liquid medium and the ground gypsum form a slurry comprising about 95 wt % to about 20 wt % gypsum.

27. The method of claim 26, wherein the liquid medium includes a phosphate.

28. The method of claim 27, wherein the solubility inhibitor is sodium trimetaphosphate.

* * * * *